United States Patent
Chou et al.

(10) Patent No.: US 10,360,121 B2
(45) Date of Patent: Jul. 23, 2019

(54) UNIVERSAL DEBUG DESIGN (71) Applicant: Quanta Computer Inc., Taoyuan (TW)

(72) Inventors: Le-Sheng Chou, Taoyuan (TW);
Sz-Chin Shih, Taoyuan (TW);
Wei-Ying Lu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 208 days.

(21) Appl. No.: 14/734,658

(22) Filed: Jun. 9, 2015

(65) Prior Publication Data

US 2016/0364306 A1    Dec. 15, 2016

(51) Int. Cl.
*G06F 11/00* (2006.01)
*G06F 11/26* (2006.01)
*G06F 11/07* (2006.01)
*G06F 11/22* (2006.01)
*G06F 11/36* (2006.01)
*G06F 11/32* (2006.01)

(52) U.S. Cl.
CPC .......... *G06F 11/26* (2013.01); *G06F 11/0745* (2013.01); *G06F 11/0769* (2013.01); *G06F 11/2284* (2013.01); *G06F 11/326* (2013.01); *G06F 11/3648* (2013.01)

(58) Field of Classification Search
CPC .. G06F 11/26; G06F 11/0745; G06F 11/0769; G06F 11/2284; G06F 11/3648
See application file for complete search history.

(56) References Cited

U.S. PATENT DOCUMENTS

| | | | |
|---|---|---|---|
| 2004/0010773 A1* | 1/2004 | Chan | G06F 11/3664 717/104 |
| 2004/0016804 A1* | 1/2004 | Namaky | G07C 5/0816 235/435 |
| 2006/0277443 A1* | 12/2006 | You | G06F 11/327 714/38.1 |
| 2010/0011130 A1* | 1/2010 | Tasher | G06F 11/3656 710/6 |
| 2014/0068352 A1* | 3/2014 | Matsuura | G06F 11/0745 714/48 |

FOREIGN PATENT DOCUMENTS

CN    1123828 C    10/2003

OTHER PUBLICATIONS

Taiwanese Office Action dated May 17, 2016.

* cited by examiner

*Primary Examiner* — Bryce P Bonzo
*Assistant Examiner* — Katherine Lin
(74) *Attorney, Agent, or Firm* — Nixon Peabody LLP; Zhou Lu (57) ABSTRACT

Embodiments generally relate to a universal debug design which involves integrating a debug controller and a debug card with display together into a single debug design. Debug codes, such as power-on self-test (POST) codes and other error codes, are generated by various subsystems of a server-related system. The codes are transmitted to a controller, which stores the codes in memory. In some embodiments, a multiplexer outputs one debug code from the multitude of received codes, based on a user or event selecting which desired debug code should be displayed. In some embodiments, a decoder converts and sends the LED display signals to a debug card, which displays the debug code on a 7-segment LED display.

16 Claims, 7 Drawing Sheets

UNIVERSAL DEBUG DESIGN

FIELD OF THE INVENTION

The disclosure relates generally to debugging approaches relating to hardware architecture.

BACKGROUND

Hardware designs, such as circuit boards, controllers, and server systems, have long utilized debugging tools to assist with the development process. Often despite best efforts, a hardware design does not work as intended, and will have to be corrected, or debugged. The debugging process typically involves iterating through each step of an implementation, until a point where a failure is apparent. In this fashion, debugging assists in determining to what point the design works, and may give an indication of how the failure can be corrected. Even in very basic circuit designs, some debug mechanism is often implemented.

SUMMARY

Aspects of the present technology provide for a universal debug design. Example embodiments encompass approaches that integrate both a debug controller module and a debug card and a display into a system that receives debug codes from a multitude of subsystems. Such subsystems in differing embodiments can include, for example, a server, server management controller, storage system, or switch system. Within an example of a server-related system, one or more debug codes may be generated from subsystem devices and components, which serve to provide debugging information to a user during the development and testing of the design. In some embodiments, the debug codes may be power-on self-test (POST) codes that are generated during an initial startup of a device. In some embodiments, they may be custom error codes generated from specific models or types of hardware components. In some embodiments, the codes are transmitted to a controller module. In some embodiments, the codes are transmitted via a bus transfer such as an Inter IC ($I^2C$) compliant bus. In other embodiments, the codes are transmitted via a network. The codes are received by the controller and stored within a memory of the controller, such as a register or buffer. In some embodiments, the debug card is configured to select a debug code from the one or more debug codes. In some embodiments, the debug card includes a selection controller (e.g., a button) that allows a user or event to trigger a selection of a debug code transmitted from a subsystem for display. The controller is configured to select one debug code from the one or more debug codes, based on the desired selection. This debug code is then sent to the debug card, where it is displayed on the debug card's display.

In some embodiments, the controller includes a multiplexer which is configured to receive multiple input codes generated from the subsystems, select a code, and output the code to a decoder. The decoder is configured to convert the code from a format readable by the multiplexer, such as binary coded decimal (BCD), to a format which can be interpreted by the debug card for display In some embodiments, the display is an LED display, and in other embodiments it is a 7-segment LED display, such that a series of 7-segment LEDs representing numeric or alphanumeric characters can be displayed. In some embodiments, the debug card also includes a selection button, which is capable of selecting a debug code from the one or more debug codes generated by the subsystems.

For example, a server may generate a POST code which indicates a failure point within a server component. The POST code is transmitted via $I^2C$ to a controller, which stores the POST code in its memory along with other error codes from other subsystems. A user triggers the selection button on the debug card such that the number representing the server is displayed, indicating that the user wishes the server's POST code to be displayed. This selection is transmitted to the controller's multiplexer, which selects the server's POST code out of the multitude of debug codes. A decoder converts this debug code from binary to 7-segment display format, and sends the debug code to the debug card. Finally, the debug card displays the server's POST code on a series of 7-segment LED displays.

BRIEF DESCRIPTION OF THE DRAWINGS

Various embodiments or examples of the invention are disclosed in the following detailed description and the accompanying drawings.

DETAILED DESCRIPTION

Various embodiments are discussed in detail below. While specific implementations are discussed, it should be understood that this is done for illustration purposes only. A person skilled in the relevant art will recognize that other components and configurations may be used without departing from the spirit and scope.

In server computing systems, as well as other computer hardware systems, debugging is often considered an essential step in the development process. Often a device will need to be debugged using some form of debugging tool before the system can be deemed ready for client operation. Typically, a debug connector is used to connect to a debug signal output port of one or more devices within the system, such as a server or storage system. In addition, a light-emitting diode (LED) display may be implemented in conjunction with the debug connector to output faults or errors, which can be used to diagnose problems with the design and implementation. In some instances, one or more 7-segment LED displays may be utilized to present errors as numbers or characters in connection with the debug connectors.

Such debug connectors and LEDs are often helpful during board or system development. However, they may be cumbersome to implement for a particular design, and may add to the cost of a project. External debugging tools often do not support specific architectures, or do not natively support debugging of pieces of software. Thus, significant development time is often spent in configuring the debugging tools to interface properly with the hardware design. Finally, debugging tools often introduce complexities into a system when a simple, efficient debug design would be preferred.

Example approaches described herein provide a universal debug design, which is capable of a multi-subsystem error code display. This design includes a controller integrated circuit (IC) to handle each subsystem error code output. The design is configured such that a user can send a signal to this controller to choose any subsystem error code to display.

Figure 1:
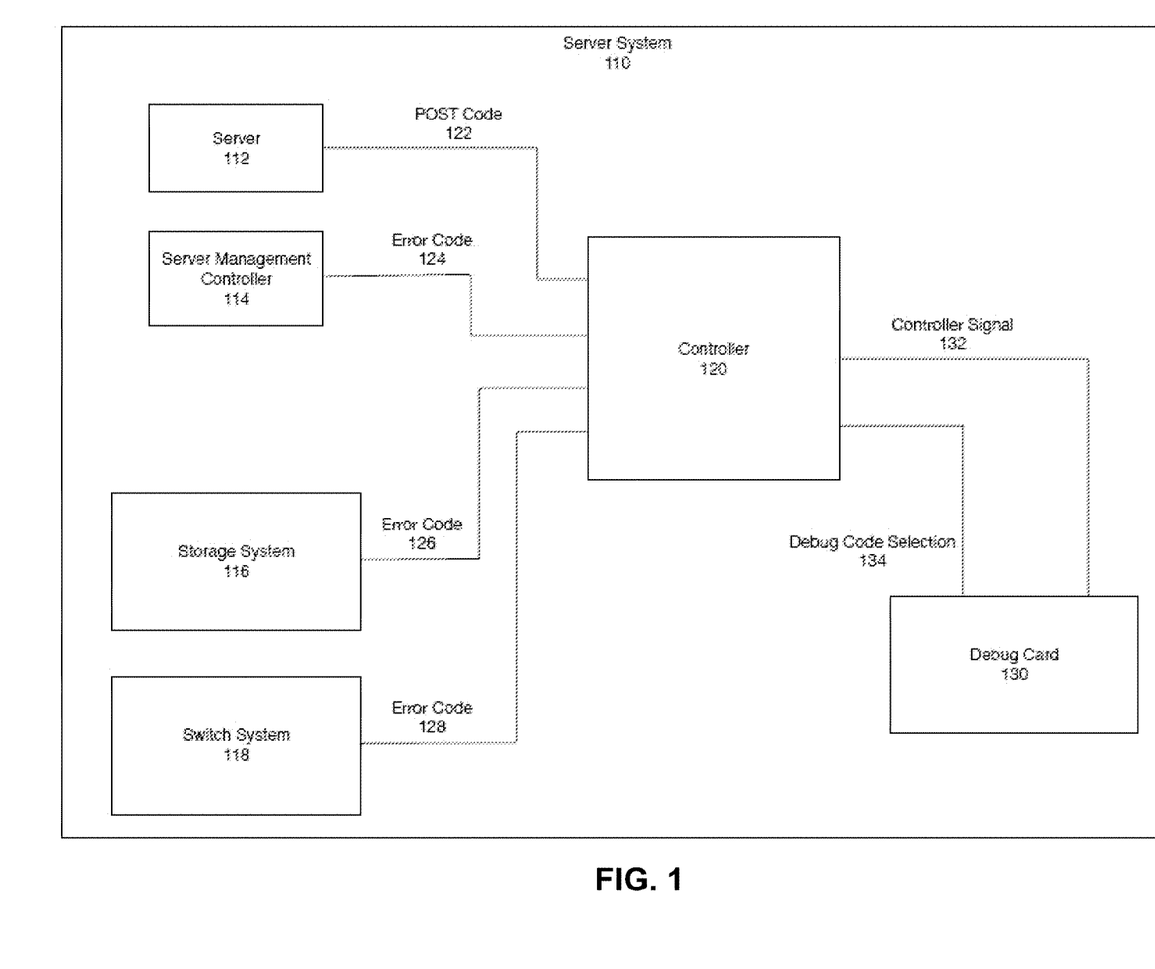
FIG. 1 is a block diagram illustrating an example universal debug design.

FIG. 1 is a block diagram illustrating an example embodiment of a universal debug design. This example approach consists of one or more subsystems which transmit error codes to a controller IC, where they are stored within the controller IC's buffer. In an example embodiment, a debug card containing a display and a selection mechanism can receive a debug code selection, and the debug code selection can be displayed on the LED display.

In the example embodiment, a server system 110 is comprised of server components and server-related devices that communicate with each other. In some embodiments, server system 110 includes at least one server and its components, as well as debugging components. In other embodiments, server system 110 may include just a server and related devices, with the debugging components external to the server system. A number of subsystems within server system 110 in need of debugging may be provided in various configurations and types, depending on the system design implemented. Within the example embodiment of FIG. 1, example subsystems include a server 112 and a server management controller 114; a storage system 116; and a switch system 118. In an example embodiment, server 112, is a server device with a variety of computing and network capabilities, consisting of a motherboard, firmware, and other components of a typical server.

Server system 110 also consists of a server management controller 114, which controls and monitors the management features of the server 112. In some embodiments, server management controller 114 may take the form of a baseboard management controller (BMC). A BMC is an independent and embedded microcontroller that in some embodiments is responsible for the management and monitoring of the main CPU, firmware and operating system of server 112. According to some embodiments, the BMC can monitor the server's hardware components by receiving data from sensors installed in the chassis, e.g., fan speeds, CPU temperature, power consumption level, etc.

Storage system 116 provides a data storage solution for server system 110. In some embodiments, the storage system may consist of one or more disk arrays, such as a storage area network array. In other embodiments, the storage system may consist of one or more hard-disk drives, solid state drives, hybrid hard drives, or flash hard drives. Switch system 118 provides one or more network switches which serve to providing switching functionality for server system 110, including filtering and transmitting data to and from network domains through a plurality of ports.

Each of these subsystems is capable of outputting signals, such as error codes. In some embodiments, such signals can be transmitted through the bus of a data processing system, such as an Inter IC ($I^2C$) complaint bus. An $I^2C$ bus is capable of interconnecting a variety of devices. Typically, servers and other data processing systems may include such a bus to communicate information such as boot information. In some embodiments, other bus standards may be used to transmit signals from subsystems. In other embodiments, the signals can be transmitted through a wired network connection, wireless network connection, Ethernet connection, near-field communications, Bluetooth technology, or other form of transfer.

In some embodiments, a power-on self-test (POST) code 122 may be transmitted from server 112 to controller 120. Within a server such as server 112, a basic input output system (BIOS) is capable of generating a POST code describing the state of the hardware during a power-on state or a power reset state of the server. The POST code indicates whether each component is functioning normally, or whether specific devices are not assembled properly before an operating system is loaded. In this way, the POST code is useful for debugging and ensuring a server operates normally. The POST code helps to identify which component of the hardware is not functioning properly. In some embodiments, this POST code is generated by the BIOS of the system and transmitted via $I^2C$ to controller 120. In some embodiments, this transmission occurs on I/O port 80. POST codes may designate a variety of errors. For example, in some embodiments, a "0000" post code may designate a timer error: "000E" may designate a drive error; "000C" may indicate that a RAM read/write test failed; and so on. Any number of POST codes are possible for transmission to controller 120.

In some embodiments, the subsystems, including server management controller 114, storage system 116, and switch system 118, may send general error codes to controller 120. These may differ depending on the type of device and the specific model of the device. For example, for storage system 116, the error code "ANE4000E" may indicate that storage space does not exist for storing a file. As another example, an error code from switch system 118 may indicate that the switch is not able to connect with server 112. In some embodiments, such error codes are generated by a subsystem and sent to controller 120 through $I^2C$. In other embodiments, other transfer approaches may be used to send these signals to controller 120.

In some embodiments, the Joint Test Action Group (JTAG) standard may be implemented on one or more subsystems. JTAG is a standard that is commonly used with debugging processes on circuit boards and controllers. Custom JTAG instructions can be provided to allow for reading registers, writing to registers, accessing data buses, and sending signals from subsystems that provide visibility for behaviors which occur within those subsystems. Output JTAG-based signals may also be sent to controller 120.

One example of controller 120 may comprise a hardware module within the server system which stores the debug signals from the various subsystems, and outputs a debug signal to debug card 130 according to a user's selection of which component to query for debug codes, for example by a selection mechanism built into debug card 130. Another example of controller 120 may comprise an integrated circuit that is built into the motherboard of server 112. In an embodiment, Controller 120 stores the error codes or signals from the subsystems within the controller's buffers or memory, determine which debug code is desired, decode the desired debug code into a format which is readable and displayable by the debug card, and send the decoded debug code to the debug card. The specifics of how controller 120 operates, and which components it contains, will be discussed further herein, especially with regard to FIG. 2. In example implementations, the controller receives signals from subsystems 110-118, and a debug code selection from a debug card relating to a desired debug code stored within the controller. Controller 120 uses these two pieces of information, and outputs controller signals 226 to debug card 130.

In example embodiments, debug card 130 may be a card within the universal debug design, which connects to controller 120, and allows for a user to perceive the error codes or signals from the various subsystems. In some embodiments, debug card 130 may be a separate device or server component rather than a card. In some embodiments, debug card 130 is integrated circuit in the motherboard of a server or other server-related device. In some embodiments, the debug card displays controller signals through a display. The display can be integrated into the debug card or can be a separate device coupled to the debug card. The display can be a LED display that displays an error code as a series of numeric or alphanumeric characters that represent the error code generated from a subsystem. In some embodiments, the LED display consists of one or more 7-segment LED displays. A 7-segment LED display is capable of displaying numeric and alphanumeric characters through an electronic display with seven segments that cumulatively can show a number or other character. In other embodiments, the display of debug card 130 can be a Liquid Crystal Display (LCD), an Organic Light-Emitting Diode (OLED), or other display. Some embodiments may use a 7-segment display while other embodiments may use other technology for rendering the error codes or signals for a user. Whichever form of display is used, controller 120 has the task of converting signals from the subsystems to be capable of displaying on debug card 130.

In an example embodiment, debug card 130 also receives input, for example through a selection trigger. The selection trigger can be activated by a user or by some other event. In some embodiments, the selection trigger is activated when a remote signal from another device sends an instruction, for example to debug card 130 or controller 120. In some embodiments, the selection trigger can be a button that is pressed. In this example, when the button is pressed, a selection toggles between multiple desired debug codes from subsystems. For example, a debug code selection of "1" may designate that a user wishes to receive a POST code 122 generated from server 112; a debug code selection of "2" may designate that a user wishes to receive an error code 124 generated from server management controller 114; a debug code selection of "3" may designate that a user wishes to receive error code 126 from storage system 116; and so on. Any alphanumeric selection can be designated for any subsystem. In an example embodiment, the number representing the debug code selection is pre-defined. In some embodiments, the number representing the debug code selection can be user-configurable. In some embodiments, the selection button is accompanied by a display on debug card 130. In some embodiments, the display visually indicates a selection of the debug code.

In an example embodiment, whenever the selection button is triggered by the user or event, a controller signal 132 is generated and transmitted. For example, controller signal 132 may be an electrical signal sent to controller 120, or may be binary data or another form of data. Controller signal 132 is transmitted from debug card 130 to controller 120. Within controller 120, a counter or other component receives the debug code selection, which is contained in controller signal 132, and increments the counter number. For example, when the trigger is pushed once, the counter may be incremented from 1 to 2. The counter then sends this selection to the multiplexer which has stored the input codes from the various subsystems. Based on the selection received from the counter, the multiplexer within controller 120 decodes the selected input code and sends it to debug card 130 in the form of signals capable of being displayed on debug card 130. Debug card 130 then displays the selected error code or signal for the user to view. Thus, debug codes are capable of being generated by devices from a multitude of subsystems 110-118, sent to controller 120, and displayed on debug card 130, with the user selecting which debug code is to be displayed.

Figure 2:
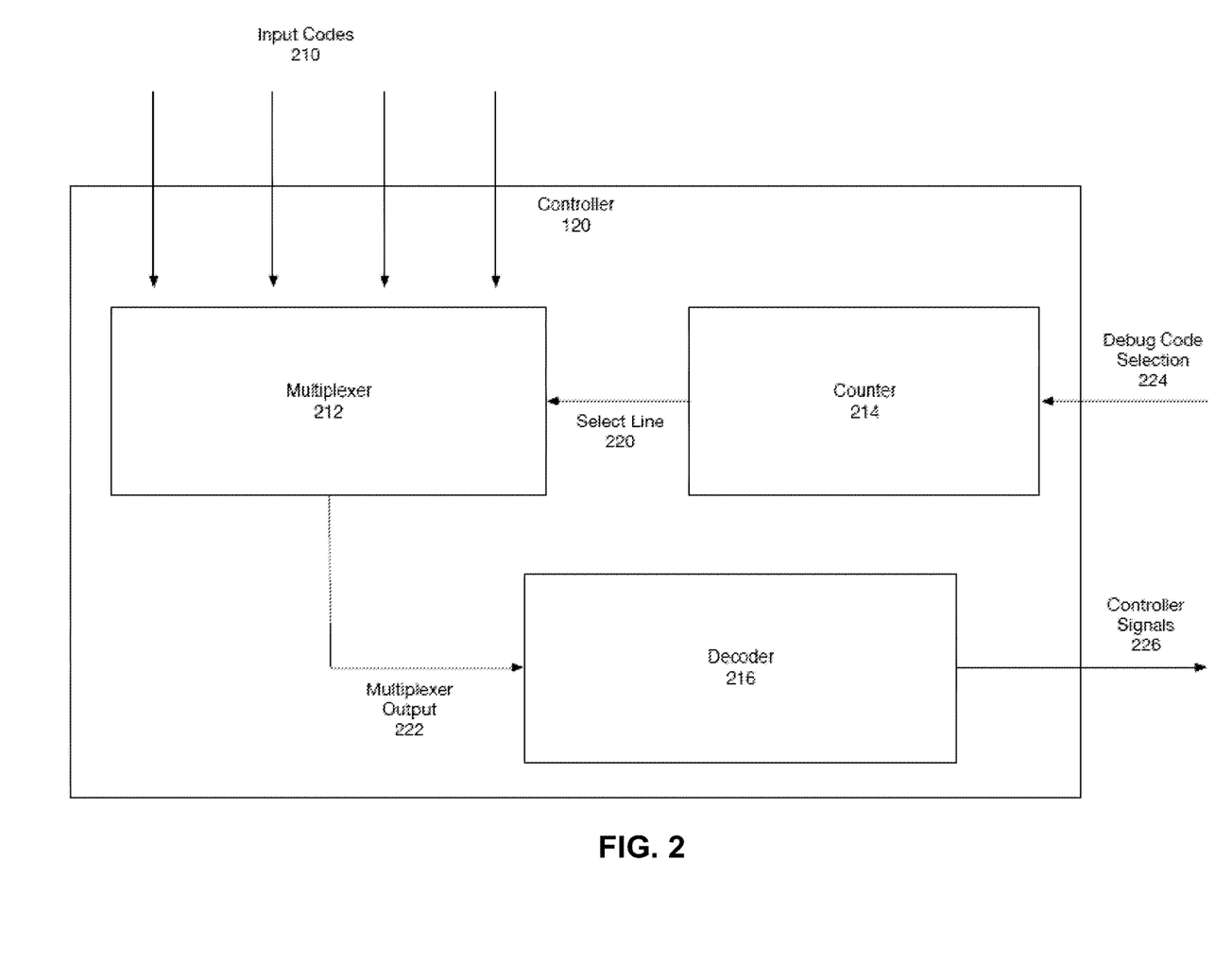
FIG. 2 is a block diagram illustrating an example controller module within a universal debug design.

FIG. 2 is a block diagram illustrating an example controller module 120 within a universal debug design. Controller 120 receives a series of input codes 210, for example from the subsystems 110-118 of FIG. 1, which have generated POST codes, error codes or other debug signals. In some embodiments, these input codes 210 may be sent via I$^2$C, while in other embodiments a different bus standard or combination of standards me be used to transmit the codes. A multiplexer 212 receives the input codes as inputs. The multiplexer, also known as a "mux," is a device that receives a multitude of input signals, selects one, and forwards the selected input in a single output line. A select line from another component is used to select which input line to send to the output. In the case of multiplexer 212 within FIG. 2, the input signals are the incoming input codes 210; the select line is select line 220; and the output is multiplexer output 222. Select line 220 designates which of the input lines should be selected for output. For example, if select line 220 designates "1" to be the selection, then input line 1 referring to server 112 will be selected. The input code generated and sent from server 112 will be selected and transmitted as multiplexer output 222.

Select line 220 is sent from counter 214, which in some embodiments is a numeric counter which is configured to be incremented when a debug code selection 224 is sent from debug card 130. Debug card 130, as discussed above with respect to FIG. 1, may contain a selection button, whereby a user or event can trigger the button and send a debug code selection signal 224 to counter 214 of controller 120. With each debug code selection 224, the counter is incremented by 1. In some embodiments, once the counter reaches a final designated number, such as 11, then upon an additional increment, the counter can reset to 0 or 1. This essentially results in a loop whereby the codes from the total number of subsystems can be cycled through and selected for the multiplexer 212 to output. The counter will be further discussed in FIG. 3.

Multiplexer 212 sends the multiplexer output 222, representing the selected debug code, to decoder 216. A decoder is a device within a hardware design which takes the form of a logic circuit that converts coded inputs into coded outputs. The purpose of decoder 216 is to convert multiplexer output 222 into controller signals 226 that can be readily understood and displayed by debug card 130. Since debug card 130 must display the debug codes on some form of display, such as a 7-segment LED display, the error codes must be converted from the format understood by the multiplexer to the format for display.

In some embodiments, decoder 216 converts multiplexer output 222 from binary coded decimal (BCD) to 7-segment display format. For example, BCD inputs may be designated by A, B, C, and D, each representing a binary digit which forms the debug code, to 7 different outputs from A to G, collectively representing a numeric character to be outputted to a single-digit 7-segment display. Additional inputs and outputs may be necessary for additional digits to be displayed. A further discussion of this conversion process will be given with respect to FIG. 4A. While a 7-segment display is illustrated in the example embodiments, several other options are envisioned, and other components may be necessary in differing embodiments to convert the debug code signals properly.

Figure 3:
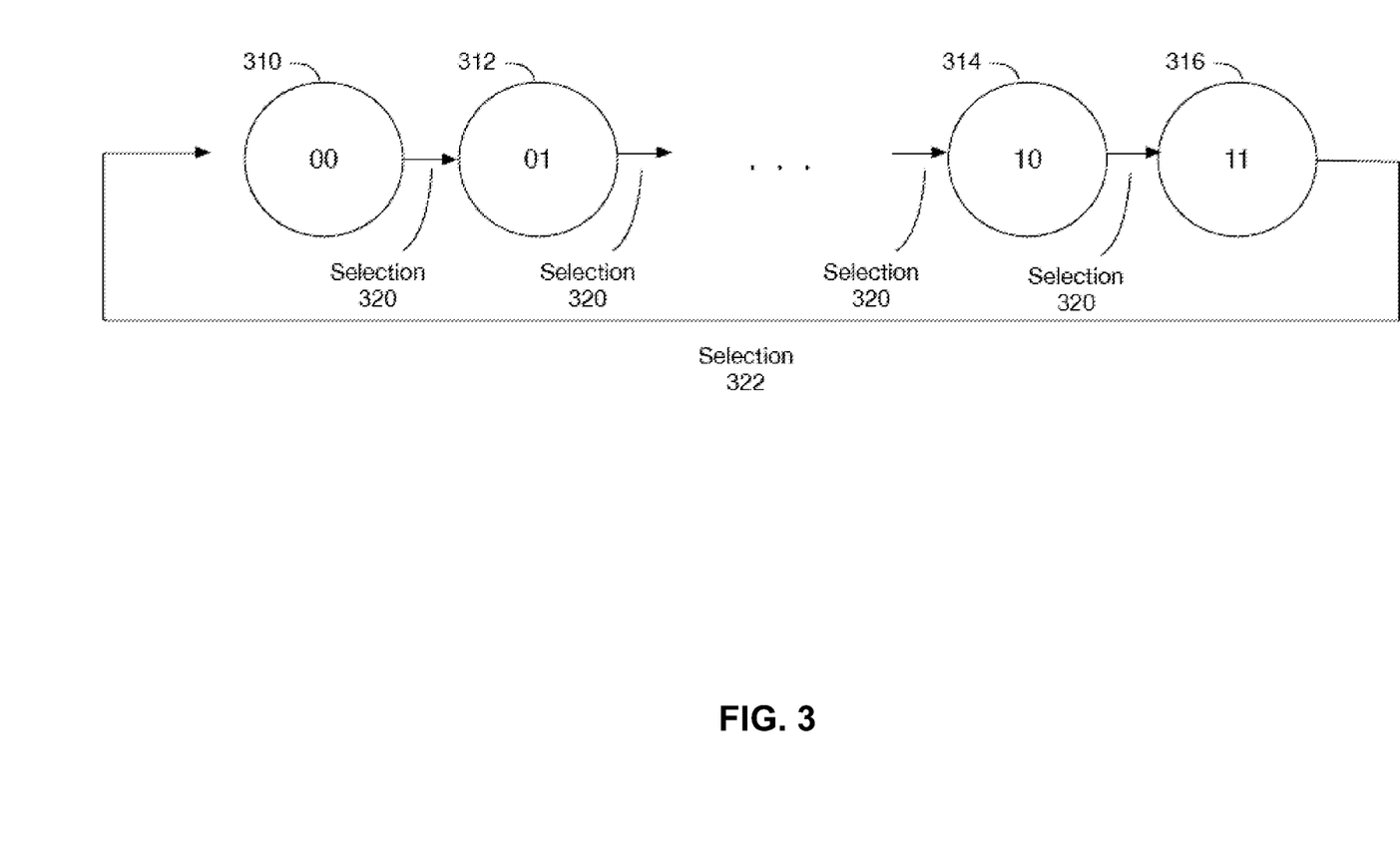
FIG. 3 illustrates an example counter behavior within a universal debug design.

FIG. 3 illustrates an example of counter behavior within a universal debug design. FIG. 3 shows the incremental properties of the counter, as well as a looping function that may exist in various embodiments.

In an example embodiment, the counter begins with an initial number 310 designated, "00". Upon the selection button being pressed at debug card 130, a debug code signal is sent to the counter, whereupon a selection trigger 320 occurs. The selection trigger 320 acts to increment the counter by 1. Thus, "00" turns into the second number 312 designated, "01". The counter can continue for any amount of increments, depending on the number of subsystems which are capable of sending debug codes which the universal debug design allows for. In the example embodiment, additional selection triggers 320 lead to a second-to-last number 314 designated, "10", and finally a last number 316 designated, "11". In some embodiments, upon an additional selection trigger 322, the counter is configured to reset back to the initial number 310 designation, "00". The counter is thus configured to loop among all of the possible numbers designating subsystems that generated debug codes and sent to the controller 120.

Figure 4A:
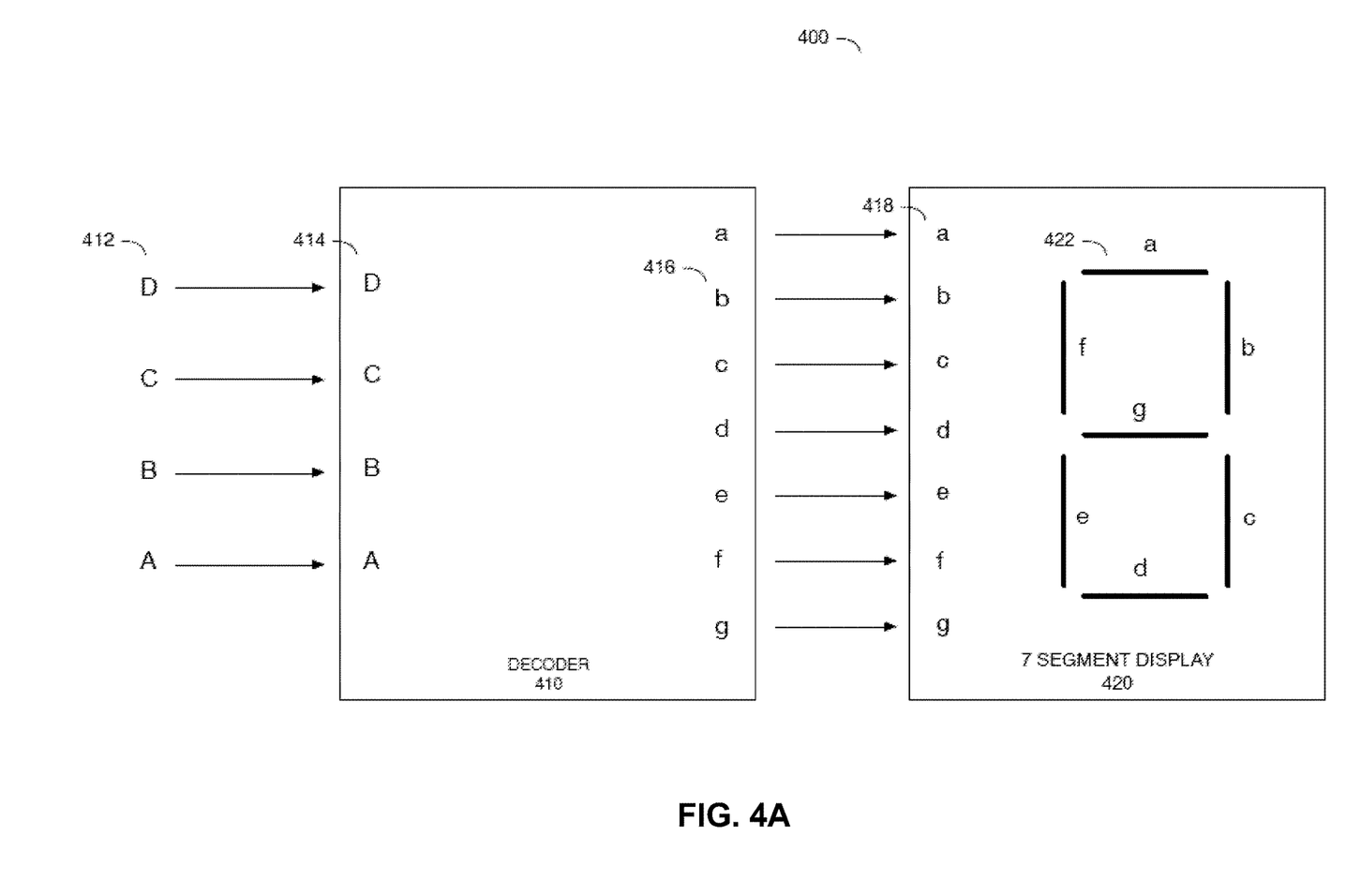
FIG. 4A illustrates an example decoder converting binary coded decimal numbers to signals for a 7 segment LED display.

FIG. 4A illustrates an example decoder 410 converting binary coded decimal numbers to signals for a 7 segment LED display 420. This figure is an example embodiment of the conversion process of decoder 216 within controller 120, which was introduced in FIG. 2 above. In the conversion process 400, a series of input signals 412 marked by "A", "B", "C", and "D" is transmitted to the decoder 410. In this example embodiment, decoder 410 functions as a binary coded decimal (BCD) to 7-segment LED display converter. Decoder 410 here is a circuit chip which is used to convert the four binary inputs "A" to "D" to seven outputs 416, represented by signals "a" to "g". These seven outputs 416 drive the 7-segment LED display 420. For example, if the input signals 412 are such that A=0, B=1, C=0, and D=0, then these binary inputs collectively refer to the single digit 2. The input signals 412 can be converted to seven outputs 416. The seven outputs 416 are then transmitted to debug card 130 which houses 7 segment display 420. These seven outputs 416 are used to drive the seven segments of 7 segment display 420, which are shown on the display 522. In this example where binary numbers representing 2 are the inputs for the decoder 510, the seven outputs from "a" to "g" would be, respectively, 1, 1, 0, 1, 1, 0, 1, representing the visual segments "a" to "g" on the display 522. When the seven outputs are mapped to the visual segments, the numerical character "2" is displayed on 7 segment display 520. Thus, any digit from 0-9 can be displayed on the debug card 130, due to decoder 510 that decodes and converts the binary signals into a displayable format.

Figure 4B:
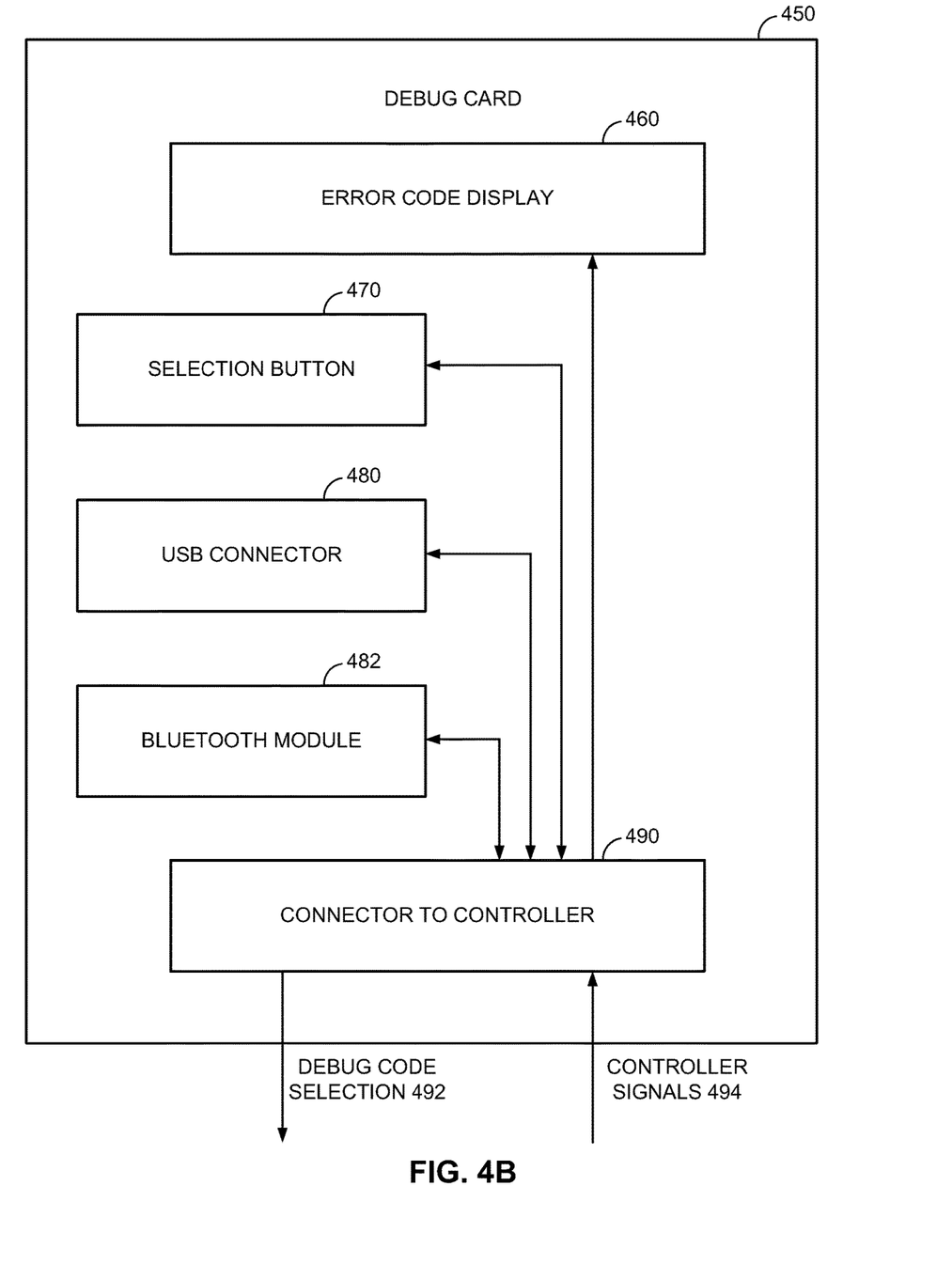
FIG. 4B illustrates an example debug card for receiving user input and displaying an error code.

FIG. 4B illustrates a debug card 450 for receiving user input and displaying an error code. In example embodiments, debug card 450 may be a card within the universal debug design, which connects to a controller, and allows for a user to perceive the error codes or signals from the various subsystems. In some embodiments, debug card 450 may be a separate device or server component rather than a card. In some embodiments, debug card 450 is integrated circuit in the motherboard of a server or other server-related device.

In some embodiments, debug card 450 receives controller signals 494 from a controller through a connector 490. The debug card 450 can display the controller signals 494 as error codes through a display 460. The display 460 can be integrated into the debug card or can be a separate device coupled to the debug card 450. The display 460 can be a LED display that displays an error code as a series of numeric or alphanumeric characters that represent the error code generated from a subsystem. In some embodiments, the LED display 460 consists of one or more 7-segment LED displays. A 7-segment LED display is capable of displaying numeric and alphanumeric characters through an electronic display with seven segments that cumulatively can show a number or other character. In other embodiments, the display 460 of debug card 450 can be a Liquid Crystal Display (LCD), an Organic Light-Emitting Diode (OLED), or other display. Some embodiments may use a 7-segment display while other embodiments may use other technology for rendering the error codes or signals for a user. In some embodiments, the error codes can be output through a USB connector 480, a Bluetooth module 482, or other such input/output device.

In an example embodiment, debug card 450 also receives input, for example through a selection trigger. The selection trigger can be activated by a user or by some other event. In some embodiments, the selection trigger is activated when a remote signal from another device sends an instruction, for example to debug card 450 or controller.

In some embodiments, the selection trigger can be activated through the USB connector 480, the Bluetooth module 482, or other such input/output device. In some embodiments, the selection trigger can be a button 470 that is pressed. In this example, when the button 470 is pressed, a selection toggles between multiple desired debug codes from subsystems. Any alphanumeric selection can be designated for any subsystem. In an example embodiment, the number representing the debug code selection is pre-defined. In some embodiments, the number representing the debug code selection can be user-configurable. In some embodiments, the selection button is accompanied by a selection display on debug card 450. In some embodiments, the selection display visually indicates a selection of the debug code. In an example embodiment, whenever the selection button 470 is triggered by the user or event, a debug code selection signal 492 is generated and transmitted through connector 490. For example, debug code selection signal 492 may be an electrical signal sent to the controller, or may be binary data or another form of data.

Figure 5:
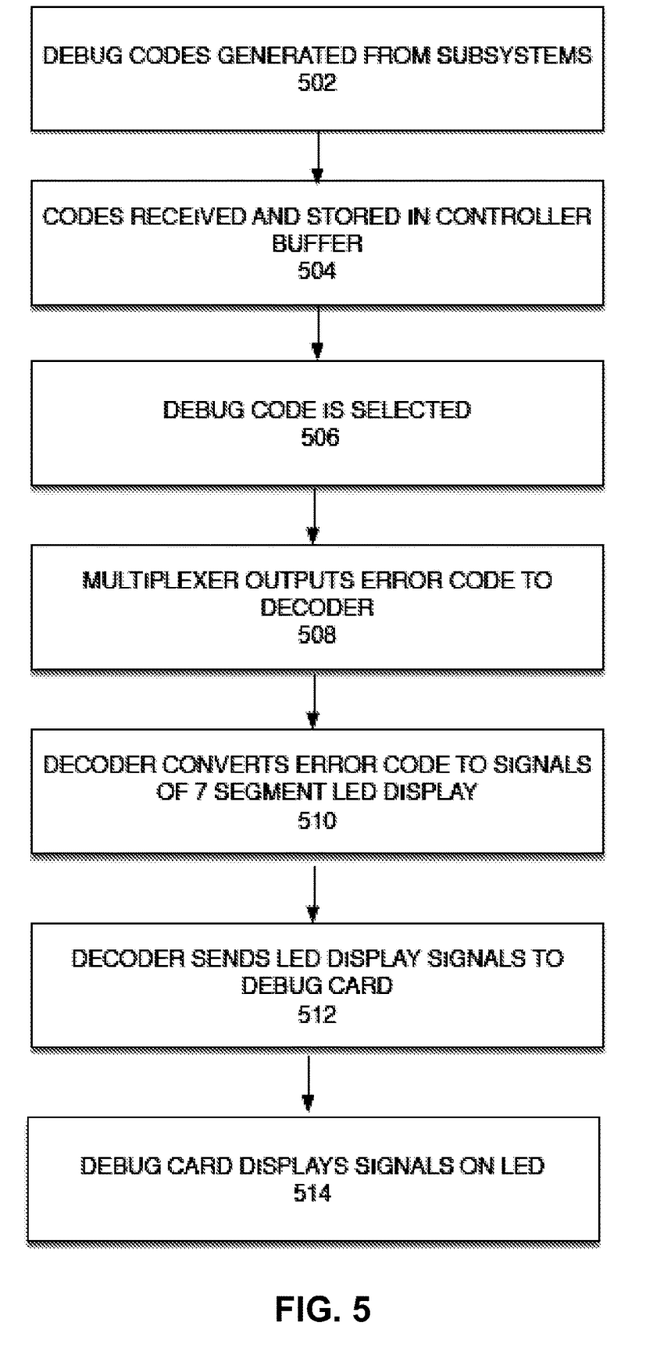
FIG. 5 illustrates an example method embodiment for a universal debug design.

FIG. 5 illustrates an example method embodiment for a universal debug design. At step 502, debug codes are generated from subsystems. The subsystems may be any subsystems 110-118 which may be part of an overall server hardware design. For example, subsystems may be server 112, server management controller 114, storage system 116, switch systems 118, and more. In some embodiments, subsystems may be capable of generating POST codes, which indicate any problems which may need to be debugged during a power-on self-test process initiated by the subsystem. In other embodiments, the debug codes may be custom error codes, warning messages, JTAG signals, and any other signal that may constitute an output related to debugging and error checking.

At step 504, the debug codes are received by controller 120. The debug codes may be transmitted via I²C or similar serial bus transfer. The debug codes are then stored in the buffers or memory of the controller. In some embodiments, the debug codes may be stored in binary format within the buffers.

At step 506, a desired debug code is selected. The desired debug code may be selected by a user or event triggering a selection button on debug card 130, which sends a triggering signal 224 to counter 214 within controller 120. Counter 214 then increments a number with each triggering signal 224 received. This number correlates to a desired debug code from a subsystem. Counter 214 then outputs this number as select line 220 to multiplexer 212. This select line 220 represents the desired debug code which is selected in step 506.

At step 508, multiplexer 212 outputs error code to decoder 216. The multiplexer receives multiple input codes 210 from the various subsystems, chooses one based on the select line 220, and outputs it in a multiplexer output 222 to decoder 216. In some embodiments, the output 220 remains as a binary number at this point, and may be a binary coded decimal output.

At step 510 of the example embodiment, decoder 216 converts the error code to signals of a 7 segment LED display. In this embodiment, the display specifically is formed via a 7-segment display, and the binary number must be converted to be readable by such a display, wherein each segment of the display must be instructed to be lighted or not lighted based on a "0" or "1" input. As discussed above in FIG. 4A, the decoder converts the binary inputs into 7 outputs representing the segments. In some embodiments, the display may not be a 7-segment LED display, but may be some other form of display. Decoder 216 converts multiplexer output 222 into a format readable by the display. In some embodiments, the inputs may represent several numeric or alphanumeric characters which must be converted properly to be read on the display.

At step 512, decoder 216 sends the controller signals 226 for display on debug card 512. In some embodiments, the display on the debug card may be several 7-segment LED displays. For example, if an error code is 4 digits, then a display would require at least four 7-segment LED displays to display the error code on the debug card. Finally, at step 514, the debug card successfully displays the signals on LED display 514.

Figure 6:
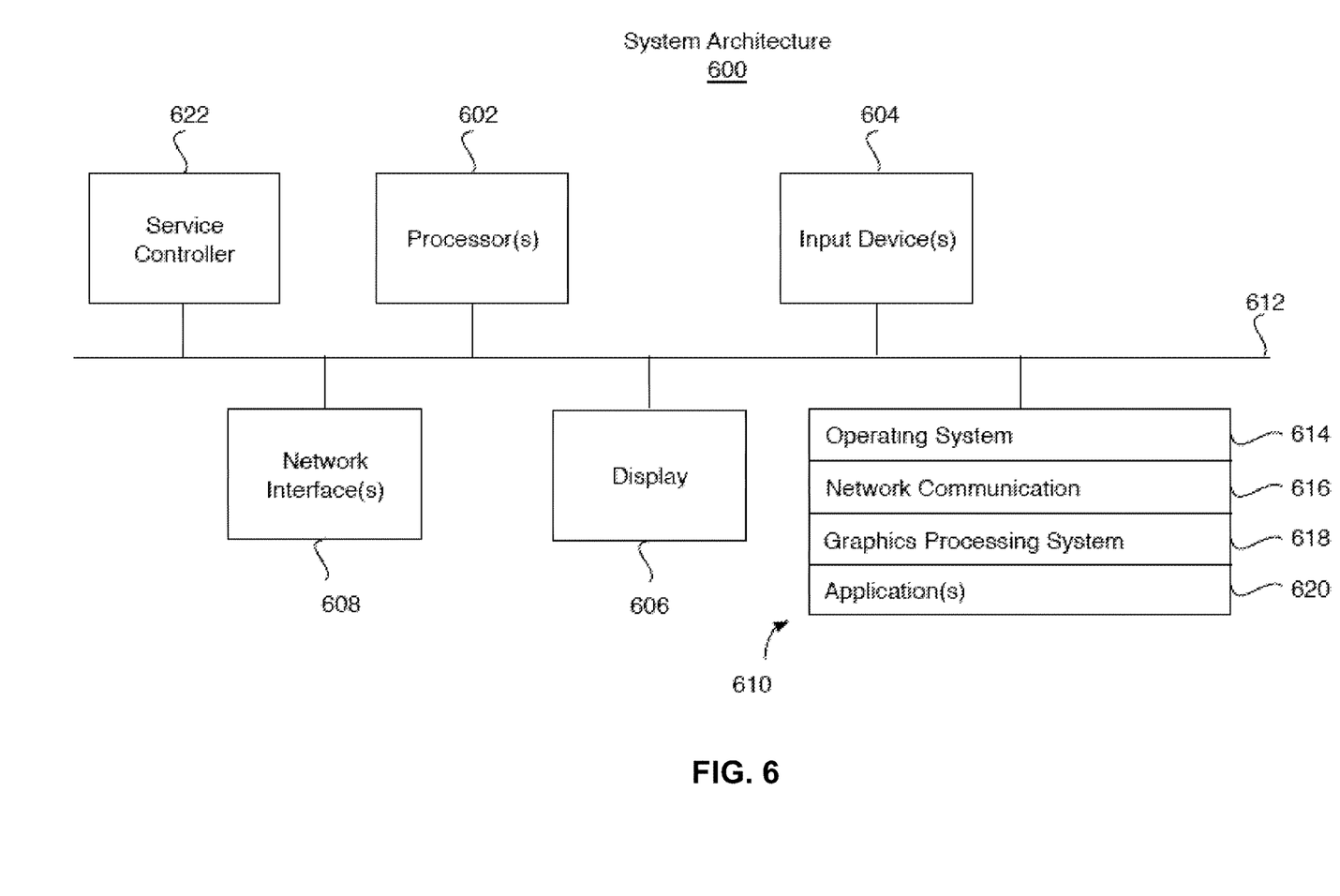
FIG. 6 is a block diagram of an example system architecture implementing the features and processes of FIGS. 1-5.

FIG. 6 is a block diagram of an example System Architecture 600 implementing the features and processes of FIGS. 1-5. The architecture 600 can be implemented on any electronic device that runs software applications derived from compiled instructions, including without limitation personal computers, servers, smart phones, media players, electronic tablets, game consoles, email devices, etc. In some implementations, the architecture 600 can include one or more processors 602, one or more input devices 604, one or more display devices 606, one or more network interfaces 608 and one or more computer-readable mediums 610. Each of these components can be coupled by bus 612.

Display device 606 can be any known display technology, including but not limited to display devices using Liquid Crystal Display (LCD) or Light Emitting Diode (LED) technology. Processor(s) 602 can use any known processor technology, including but are not limited to graphics processors and multi-core processors. Input device 604 can be any known input device technology, including but not limited to a keyboard (including a virtual keyboard), mouse, track ball, and touch-sensitive pad or display. Bus 612 can be any known internal or external bus technology, including but not limited to ISA, EISA, PCI, PCI Express, NuBus, USB, Serial ATA or FireWire.

Computer-readable medium 610 can be any medium that participates in providing instructions to processor(s) 602 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 610 can include various instructions 614 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 can establish and maintain network connections (e.g., software for implementing communication protocols, such as TCP/IP, HTTP, Ethernet, etc.).

A graphics processing system 618 can include instructions that provide graphics and image processing capabilities. For example, the graphics processing system 618 can implement the processes described with reference to FIGS. 1-5. Application(s) 620 can be an application that uses or implements the processes described in reference to FIGS. 1-5. For example, applications 620 can generate the console messages (e.g., serial output) that is redirected by the service controller using HTTP. The processes can also be implemented in operating system 614.

Service controller 622 can be a controller that operates independently of processor(s) 302 and/or operating system 314. In some implementations, system controller 322 can be powered and operational before processor(s) 302 are powered on and operating system 314 is loaded into processor(s) 302. For example, system controller 322 can provide for pre-OS management of the computing device through a dedicated network interface or other input device. For example, system controller 322 can be a baseboard management controller (BMC) that monitors device sensors (e.g., voltages, temperature, fans, etc.), logs events for failure analysis, provides LED guided diagnostics, performs power management, and/or provides remote management capabilities through an intelligent platform management interface (IPMI), keyboard, video, and mouse (KVM) redirection, serial over LAN (SOL), and/or other interfaces. Service controller 622 can be implement the processes described with reference to FIGS. 1-5 above. For example, service controller 622 can be configured with a web server for redirecting the serial output over a network using HTTP.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method in a server system having a plurality of components, a server controller, and a debug card, the plurality of components communicatively coupled to the service controller and including a server and a server management controller for the server, the service controller being a controller integrated circuit (IC), the service management controller operating independently of a processor of the server, the method comprising:
   receiving via an Inter IC ($I^2C$) interface, at the service controller, a plurality of debug codes, the plurality of debug codes transmitted from the plurality of components;
   storing the plurality of debug codes in the service controller;
   receiving, at the service controller, an input indicating a selection of a first debug code from the plurality of debug codes; and
   sending, by the service controller and in response to the input, a control command to a debug card to cause the debug card to display the first debug code,
   wherein the method improves conventional debugging approaches by integrating the service controller, the debug card, and a display into the server system.

2. The method of claim 1, wherein at least one of the plurality of the debug codes comprises a power-on self-test (POST) code.

3. The method of claim 1, wherein the first debug code comprises a binary coded decimal (BCD) format, and further comprising:
   converting the first debug code from BCD format to 7 segment display format.

4. The method of claim 1, wherein receiving input indicating a selection of a first debug code further comprises:
   receiving the first debug code from a multiplexer.

5. The method of claim 1, further comprising:
   receiving an indication that a selection event was triggered; and
   incrementing a counter.

6. The method of claim 1, wherein the first debug code is displayed on a light-emitting diode (LED) display.

7. The method of claim 1, further comprising:
   transmitting the first debug code to a decoder;
   converting, at the decoder, the first debug code to a first signal; and
   interpreting the first signal for a display.

8. A server system, comprising:
   a plurality of components including a server and a server management controller of the server;
   a service controller, operable to:
      receive via an Inter IC ($I^2C$) interface a plurality of debug codes, the plurality of debug codes transmitted from the plurality of components;
      store the plurality of debug codes;
      receive an input;
      determine a first debug code from the plurality of debug codes to output based on the input; and
      send a control command to cause display of the first debug code; and a debug card, operable to receive the control command and display the first debug code based on the control command, wherein the server improves conventional debugging approaches by integrating the service controller, the debug card, and a display into the server.

9. The server system of claim 8, wherein the debug card comprises a light-emitting diode (LED) display.

10. The server system of claim 9, wherein the LED display is a 7-segment LED display.

11. The server system of claim 8, wherein the service controller is further operable to:
receive a debug selection code signal; and
select a debug code according to the debug selection code signal.

12. The server system of claim 11, wherein the debug card comprises a debug code selection mechanism, and wherein the debug card is further operable to:
detect activation of the debug code selection mechanism; and
send the debug selection code signal to the service controller.

13. The server system of claim 8, wherein the service controller comprises a multiplexer, and wherein the multiplexer is operable to output a first debug code of the plurality of debug codes.

14. The server system of claim 8, wherein the debug card further comprising a decoder operable to convert the first debug code to display signals, wherein the display signals are transmitted to the debug card for displaying the first debug code.

15. The method of claim 1, wherein the plurality of debug codes are transmitted by an inter-integrated circuit signal.

16. The server system of claim 8, wherein the service controller is communicatively coupled to the plurality of components via an inter-integrated circuit bus.

* * * * *